(No Model.)

G. W. STILSON.
CHAMBER PAIL.

No. 381,180. Patented Apr. 17, 1888.

WITNESSES:
G. W. Green
A. J. Moore

INVENTOR:
Geo. W. Stilson

UNITED STATES PATENT OFFICE.

GEORGE W. STILSON, OF BROOKLYN, NEW YORK.

CHAMBER-PAIL.

SPECIFICATION forming part of Letters Patent No. 381,180, dated April 17, 1888.

Application filed May 3, 1886. Serial No. 201,007. (No model.)

*To all whom it may concern:*

Be it known that I, GEORGE W. STILSON, a citizen of the United States, and a resident of Brooklyn, in the county of Kings and State of New York, have invented certain new and useful Improvements in Chamber-Pails, of which the following is a specification.

My invention relates especially to pails employed for removing chamber-slops, &c., and has for its object the provision of a simple, neat, and durable device, easy to keep clean and free from foul odor, and which may be used for prison or house purposes without the addition of a seat or support for the body other than the rim of the lining of the pail.

To attain the desired end, my invention consists, essentially, of a metal body or casing wherein is secured and supported an earthenware lining, said lining being held against displacement by a bead engaging with the metal casing, the top or rim of the lining extending over the edge of the casing, all of which will be hereinafter first fully described, and then pointed out in the claims.

Figure 1:
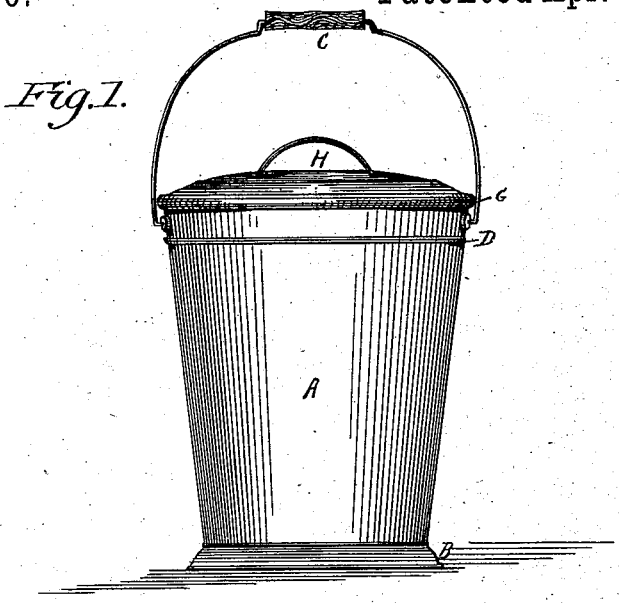
Figure 2:
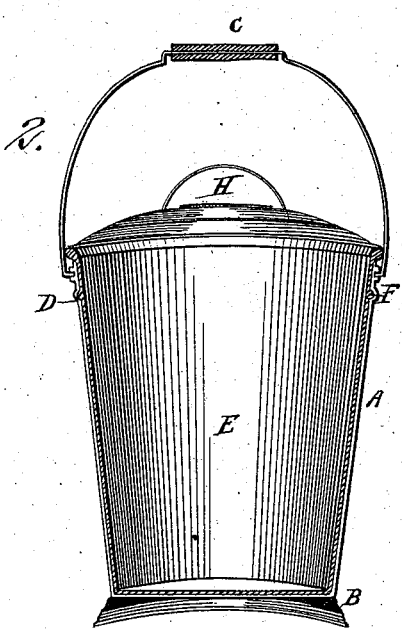

In the drawings, Figure 1 is a view in elevation of my improved pail, and Fig. 2 is a vertical central sectional view thereof.

Like letters of reference wherever they occur indicate corresponding parts in both figures.

A is the metal casing or body of the pail, made of approved form and material and having a supporting-base, B, at bottom and a carrying bail or handle, C, at top.

D is a bead formed in body A.

E is an earthenware or equivalent lining, having a circumferential bead, F, which enters the bead D in the metal, as plainly shown in Fig. 2.

G is the rim of the lining E extending over the rim of body A, forming a seat when the device is used for chamber purposes.

H is a cover, fitting securely upon the top of the device.

When constructed and arranged in accordance with the foregoing description, it will be seen that the lining is supported by the bottom of the casing, by the bead, and by the overhanging rim at top, securing and holding all parts firmly in place.

In assembling the parts, the casing is seamed around the lining or the lining is sprung into the casing.

Having now fully described my invention, what I claim as new therein, and desire to secure by Letters Patent, is—

1. A chamber-pail consisting of a metal body or casing supporting an earthenware lining, provided with a circumferential bead, as set forth, said lining being provided with an overhanging edge or rim at top, and a circumferential bead therebelow, substantially as shown and described.

2. The combination, with the metal body A, having circumferential bead D, of the earthenware lining E, having circumferential bead F, and overhanging rim G, the whole arranged substantially as and for the uses and purpose shown and described.

Signed at the city of New York, in the county of New York and State of New York, this 19th day of September, A. D. 1885.

GEO. W. STILSON.

Witnesses:
G. W. GREEN,
A. J. MOORE.